United States Patent [19]
Rehbein

[11] 4,094,141
[45] June 13, 1978

[54] TERMINAL CHAIN LINK WITH BUILT-IN INDICATOR

[75] Inventor: Friedhelm Rehbein, Ober-Oesbern, Germany

[73] Assignee: August Thiele, Kalthof, Germany

[21] Appl. No.: 760,469

[22] Filed: Jan. 18, 1977

Related U.S. Application Data

[63] Continuation of Ser. No. 592,047, Jun. 30, 1975, abandoned.

[30] Foreign Application Priority Data

Mar. 12, 1974 Germany .............................. 2411725

[51] Int. Cl.² .............................................. F16G 15/04
[52] U.S. Cl. ..................................................... 59/93
[58] Field of Search .................. 59/85, 86, 93, 80, 88, 59/78, 84, 35

[56] References Cited

U.S. PATENT DOCUMENTS

| | | | |
|---|---|---|---|
| 1,222,997 | 4/1917 | Rottmer | 59/86 |
| 1,836,169 | 12/1931 | Humphreys | 59/93 |
| 2,247,837 | 7/1941 | Gordon | 59/84 |
| 2,354,617 | 7/1944 | Schacht | 59/91 |
| 2,714,798 | 8/1955 | Linnenbank | 59/84 |
| 2,869,255 | 1/1959 | Page | 59/86 |
| 3,795,951 | 3/1974 | Ratcliff | 59/93 |
| 3,844,221 | 10/1974 | Fromme | 59/85 |

FOREIGN PATENT DOCUMENTS

| | | | |
|---|---|---|---|
| 130,344 | 12/1950 | Sweden | 59/86 |
| 22,313 of | 1897 | United Kingdom | 59/35 |
| 112,796 | 1/1918 | United Kingdom | 59/86 |

*Primary Examiner*—C.W. Lanham
*Assistant Examiner*—Gene P. Crosby
*Attorney, Agent, or Firm*—Michael J. Striker

[57] ABSTRACT

The link has a body provided with two arms, and an integral transverse brace connects the arms and is formed with an information-bearing shield as an indicator for load-factor and other information pertaining to the chain link.

10 Claims, 12 Drawing Figures

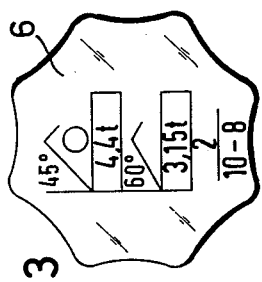
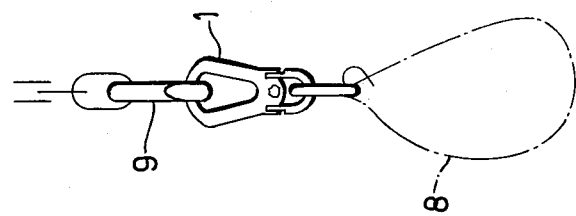
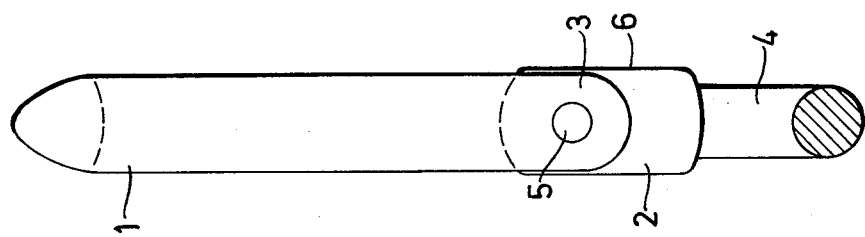
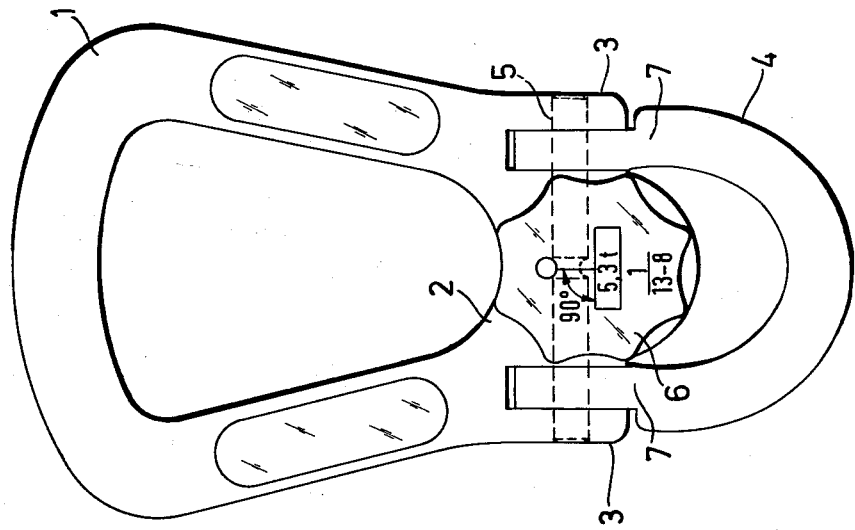

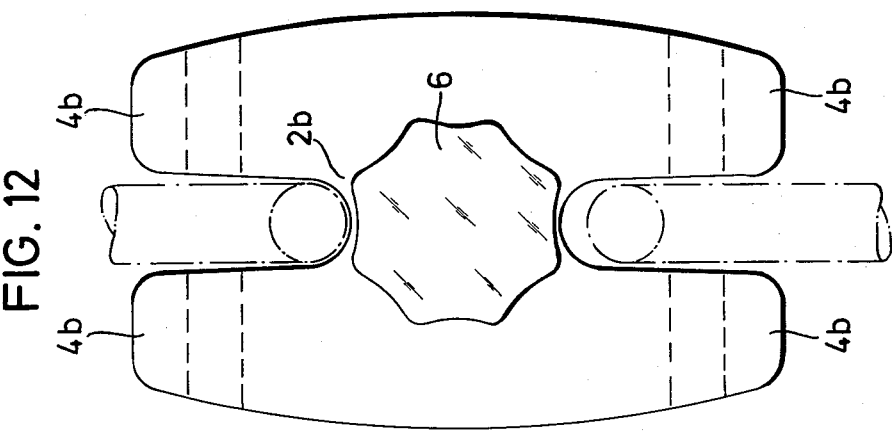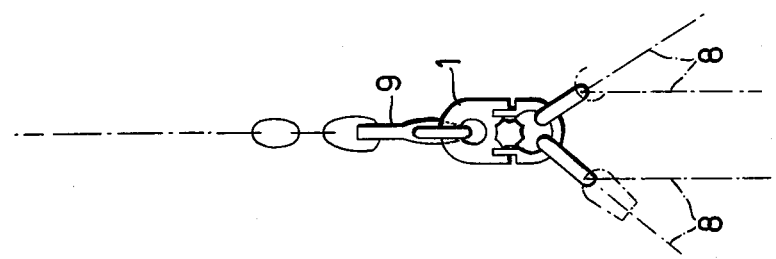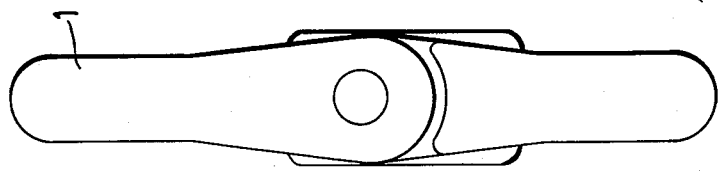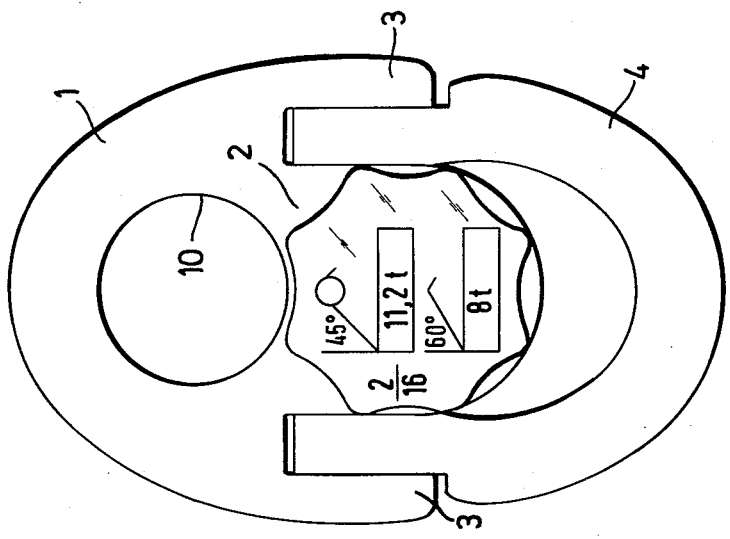

4,094,141

TERMINAL CHAIN LINK WITH BUILT-IN INDICATOR

CROSS-REFERENCE TO RELATED APPLICATION

This is a continuation of application Ser. No. 592,047, filed June 30, 1975, now abandoned.

BACKGROUND OF THE INVENTION

The present invention relates generally to a chain link, and more particularly to a terminal chain link. Specifically, the invention relates to a terminal chain link with a built-in indicator.

Some countries, for example West Germany at least, require that the terminal links of chains used for heavy loads, as in the case of cranes, marine applications and the like, be provided with an indicator shield which is to be of relatively large size and which has a polygonal configuration, the number of sides of the configuration being indicative of the quality of the chain on which the shield is provided, i.e. of the load-bearing capabilities of the chain. In addition, the shield has to have a certain color and further is to be provided with indicia furnishing specific information as to the load-carrying capability, manufacturing numbers, and other information.

It is known to provide such a shield as a hanger, i.e. a separate element which is connected to the terminal chain link by means of an annular ring that is usually welded shut. The requirement is that the shield be so provided on the terminal chain link that it cannot become disengaged therefrom.

However, if the shield hangs from the terminal chain link in this manner it is often found to be disturbing, because it may be in the way in certain operations, especially because the ring that connects the shield to the terminal chain link must be of strong and large-dimensioned material in order to prevent its tearing-off. All in all, a shield which depends from the terminal chain link by means of its own connector, such as the aforementioned ring-shaped connector, may not only be in the way in certain operations, but constitutes a clear hazard, as it may cause accidents.

SUMMARY OF THE INVENTION

It is an object of the present invention to overcome the disadvantages of the prior art.

More particularly, it is an object of the present invention to provide a terminal chain link provided with an integral indicator so as to avoid the aforementioned disadvantages.

The indicator is to be located in such a manner that it is fixed with reference to the terminal chain link and cannot pose any hazards or inconveniences.

An additional object of the invention is to utilize the indicator to stabilize the terminal chain link itself, i.e. to make the terminal chain link more rigid.

In keeping with these objects, and with others which will become apparent hereafter, one feature of the invention resides in a terminal chain link with built-in indicator which comprises a link body having two arms, and an intergral transverse brace portion connecting the arms and being formed with an information-bearing shield as an indicator for load-factor and other information pertaining to the chain link and, hence, to the chain of which the link constitutes the terminal element.

Provided in this manner, the shield cannot only be large and strong, but also is completely integrated as part of the terminal chain link, thus no longer posing an accident hazard, no longer being in the way when the chain link has to be handled, and in addition serving to strengthen the chain link itself. Moreover, the position of the shield on and relative to the chain link is fixed and can never vary and any possibility of losing the shield is precluded. The invention can be employed in all types of chain links, i.e. welded or forged chain links, or the like. The term "terminal chain link" as employed herein and in the claims is intended to include an intermediate link, i.e. a link which may be used by itself and may connect two elements together, thus constituting the "terminal link" of one or the other of these elements as long as it remains connected thereto.

One advantageous embodiment of the invention utilizes a chain link in which a shackle-like portion is pivoted to lateral arms of the chain link in the region of the integral shield-bearing brace portion, the bolt securing the shackle-like portion to the chain link extending through a bore in the brace portion. The brace portion itself may be configurated of annular or substantially annular shape and the shield can serve to prevent the jamming-together of links of several chains which are hooked into the shackle-like portion.

In this embodiment the brace portion can be particularly strong, produced by forging or the like, and is therefore capable of withstanding high and very high stresses acting upon it in various different directions. The fact that a bore for the bolt is formed in it does not lead to any significant weakening of the brace portion. If the link is produced by forging, the shield is produced at the same time, rather than having to be produced separately in a different operation, and in a possibility that the link might be provided with a shield of the wrong type and offering the wrong information, is thereby reliably precluded.

The brace portion may be provided with or have the shield formed on it, but it may itself have the shape of the shield in which case any further steps beyond the initial manufacture of the link with the brace portion are unnecessary.

The arrangement of the shield in the manner according to the present invention also offers the possibility that both flat surfaces of the brace portion may be provided with the shield, so that the character of the chain link can be identified by glancing at either one of its sides. Any additional indicia that may have to be provided on the shield, such as numerals or the like, may be distributed over the two sides of the brace portion, so that both shield surfaces, i.e. one on each side, can be produced simultaneously during forging of the link.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of one embodiment of the invention;

FIG. 2 is an edge view of FIG. 1, partly in section;

FIG. 3 is a detail plan view of that side of the shield in FIG. 1 which is not visible in that Figure;

FIG. 4 is a diagrammatic illustration, showing one manner in which the link of FIGS. 1–3 can be employed;

FIG. 5 is a view similar to FIG. 4, showing another manner in which the link can be employed;

FIG. 6 is a view similar to FIG. 1, but illustrating a further embodiment of the invention;

FIG. 7 is an edge view of FIG. 6;

FIG. 8 is a diagrammatic illustration, showing the use of the link in FIGS. 6 and 7 for load-supporting applications;

FIG. 12 is a view similar to FIG. 11 but showing yet another embodiment of the invention.

DESCRIPTION OF THE PREFERRED EMBODIMENTS

Figure 9:
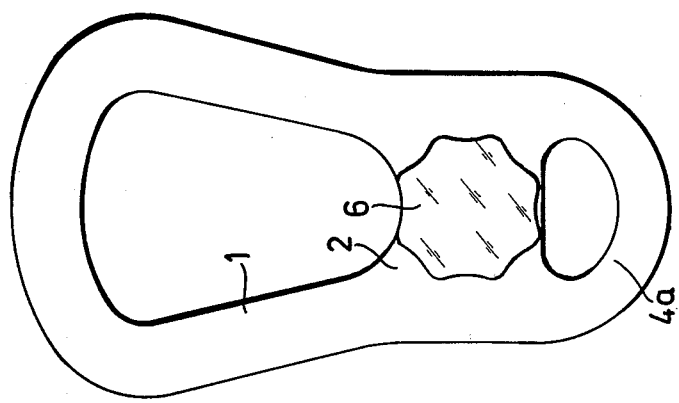
FIG. 9 is a view similar to FIG. 6, illustrating an additional embodiment of the invention.

FIGS. 1–3 illustrate one embodiment of the invention, and FIGS. 4 and 5 illustrate two possible ways of using it for connection with chains for load lifting purposes.

The link 1 in FIGS. 1–3 is a forged link having a loop-shaped configuration and a substantially pear-shaped outline. It has two lateral arms which are connected by a transverse brace 2 and the link 1 is formed with lateral outer connecting portions 3 for the connection of additional chain links or of a shackle 4. The shackle 4 which is illustrated is connected with the link 1 by means of a transverse bolt 5 which extends through bores in the portions 3, in the arms 7 of the shackle 4 and in the transverse brace 2.

The transverse brace 2 serves to strengthen and make more rigid the chain link 1. In addition, however, it constitutes a built-in indicator, being provided with a shield 6 which is configurated as a polygonal as required by certain governmental regulations, the number of sides of the polygon being indicative of the load-bearing capability of the link 1. The polygon may be five sided, six sided, seven sided or eight sided, depending upon the load-bearing capability of the link and in conformance with governmental regulations. In addition, to conform with these regulations the shield 6 is painted with the required indicator color on both sides of the brace 2 (compare FIGS. 1 and 3) and is provided on those sides with any additional indicia required, for example numerals or the like.

The diameter of the brace 2 constituting the builtin indicator shield 6 corresponds approximately to the inner spacing of the arms 7 of the shackle 4. The shield is provided substantially in the plane of the outer flat surfaces of the brace 2 and the link 1, so that the link 1 does not have any projecting portions, which is evident from FIG. 2. The slight weakening of the brace 2 resulting from the bore formed therein for the bolt 5 is not significant, because the brace 2 is very massive and its strength is not influenced by the presence of the bore. Since the downwardly facing end of the brace 2 is convexly curved into the interior of the shackle 4, this configuration contributes to maintaining chain links that are hooked into the shackle 4 from a plurality of different chains, in proper position relative to one another so that they cannot become jammed together.

FIG. 4 shows how the chain link 1 can be connected with a single-strand chain 8 which may be looped about a bundle of pipes or the like. Reference numeral 9 identifies the hook of a not illustrated crane or other load-lifting device which is hooked into the link 1.

FIG. 5 is analogous to FIG. 4, but illustrates how two (or more) load lifting chains 8 can each be connected with the shackle of link 1, and in turn can be connected at their other ends by means of appropriate hooks or the like to a box-shaped or otherwise configurated load.

FIGS. 6 and 7 illustrate a further embodiment of the invention, and FIG. 8 shows how the link of FIGS. 6 and 7 can be utilized. As the link in FIGS. 6 and 7 differs from that in FIGS. 1–3 only in its shape, like reference numerals have been employed as in FIGS. 1–3. The link 1 here is provided with a circular eye 10 and the overall contour of the link 1 resembles half of an elipse which is provided with a transverse brace portion 2 as in FIG. 1. The portions 3 are again provided, being formed with the aforementioned bores, as are the arms of the shackle 4 and the transverse brace 2, so that a bolt (corresponding to the bolt 5 of FIGS. 1 and 2) can be used to connect the shackle 4 with the link 1. The brace 2 is again configurated as a shield as in the preceding embodiment.

FIG. 8 shows how the link 1 of FIGS. 6 and 7 can be utilized. Of course, other ways of utilization are possible, but FIG. 8 shows four load-lifting chains 8 connected to the shackle 4.

Figure 10:
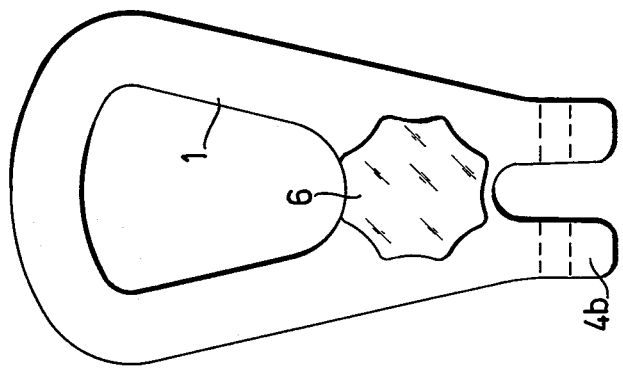
FIG. 10 is a view similar to FIG. 9, showing a further embodiment of the invention.

FIGS. 9 and 10 show two further links 1 according to the present invention, which differ from the preceding ones in that they have a different contour and that in FIG. 9 the link 1 is formed with an integral shackle portion 4a through the opening of which the load-lifting chains may be hooked. In FIG. 10 arms 4b project downwardly of the transverse brace portion formed with the shield 6, and are provided with bores so that a bolt can be passed through these bores and through a corresponding bore in a portion of a link or other element (not shown) which is located between these arms 4b and which cannot be pivotally connected to the link 1 of FIG. 10. Of course, it is also possible simply to pass the bolt through a chain link that is located between the arms 4b.

Figure 11:
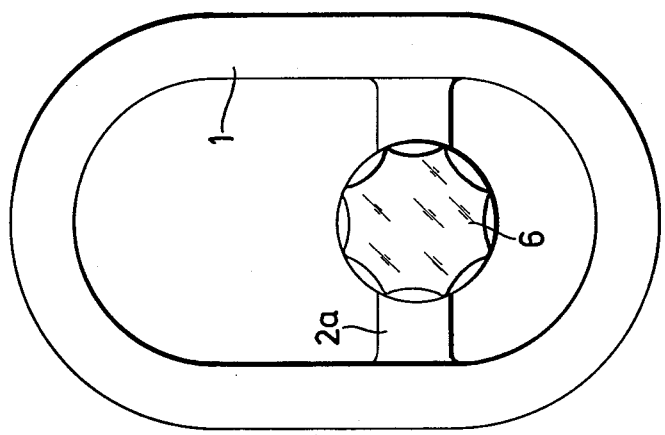
FIG. 11 is a view analgous to FIG. 10, illustrating an additional embodiment of the invention.

The embodiment of FIG. 11 is a welded chain link, unlike those of FIGS. 9 and 10 which are forged in unitary configuration. The chain link in FIG. 11 has the basic portion or body of substantially elliptical outline, and the brace 2a is a separate element that is welded to the body of the link 1. The brace 2a has the shields 6 (only one visible) either forged on it or formed on it in other ways, for example by pressing.

FIG. 12, finally, shows a further embodiment of the novel chain link which is forged and configurated as a double-bifurcated member having arms 4b at its opposite ends which are provided with bores through which bolts may be passed, into which bolts the broken-line illustrated links of two chains may be hooked. The transverse brace 2b is located in the center plane of symmetry of the chain link in FIG. 12 intermediate the opposite ends provided with the arms 4b, and is provided on both sides, (only one visible) with the shield 6 that may be provided by forging at the same time as the link is being produced.

It will thus be seen that the present invention utilizes a built-in indicator shield in the context of a chain link, and moreover utilizes the portion of the chain link that is formed with the indicator shield as a reinforcement for the structural stability of the chain link, thus not only strengthening the chain link but also meeting the legal requirements concerning the indication of the load bearing capability of the link by providing the shield 6.

It will be understood that each of the elements described above, or two or more together, may also find a useful application in other types of constructions, differing from the types described above.

While the invention has been illustrated and described as embodied in a terminal chain link with a built-in indicator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A terminal chain link with built-in indicator, comprising a link body having two arm portions each formed with a recess and having an end section, and a brace portion of one-piece with said arm portions and extending between said end sections of the latter, said link body having an interior passage extending through said arm portions and said brace portion, said link body also having a polygonal shield portion having equiangularly spaced vertices and inwardly curved edge portions intermediate said vertices, said shield portion being of one-piece with said brace portion of said link body and having opposite sides which lie along a plane in which said arm portions lie and bear information as to load factor and other analogous information, said shield portion having a transverse dimension in direction normally of the plane exceeding that of said end sections of said arm portions and that of said brace portion so as to both reinforce the link body in the region of said brace portion weakened by said passage, and also make the load-bearing characteristic of the chain link readily determinable whereby the one-piece construction of said arm portions, said brace portion and said shield portion strengthens the chain link; a shackle having spaced end portions each insertable into a respective one of said recesses and each having an interior bore which registers with said passage upon insertion of said end portions into said recesses; and a bolt extending through said registering bores and passage for pivotally connecting said shackle with said link body for movement in a path which is remote from said shield portion so as to prevent mechanical interference with the latter during pivoting movement of said shackle.

2. A terminal chain link as defined in claim 1, wherein said shackle is of generally U-shaped configuration; and wherein said brace portion and said shield portion have a convexly curved common lower end which extends in direction towards the interior of said shackle for a distance sufficient to define a gap with said shackle, said gap being of such dimensions as to accommodate a single chain link that is hooked onto the shackle with play and to prevent more than one such chain link from stacking one above another in said gap.

3. A terminal chain link as defined in claim 1, wherein said link body has a loop-shaped configuration and a substantially pear-shaped outline.

4. A terminal chain link as defined in claim 1, wherein said link body has a half-ellipsoid configuration and is provided with a circular eye.

5. A terminal chain link as defined in claim 1, wherein said shield portion is annular.

6. A terminal chain link as defined in claim 1, wherein said opposite shield sides have flat surfaces.

7. A terminal chain link as defined in claim 1, wherein said link body and said brace portion are of steel.

8. A terminal chain link as defined in claim 1, wherein said link body and said brace portion are of forged steel.

9. A terminal chain link as defined in claim 1, wherein the polygonal outline of said shield portion is such as to indicate by its shape some of said information pertaining to the chain link.

10. A terminal chain link with built-in indicator, comprising a metallic link body having two metallic arm portions each formed with a recess and having an end section, and a metallic brace portion of one-piece with said arm portions and extending between said end sections of the latter, said link body having an interior passage extending through said arm portions and said brace portion, said link body also having a polygonal metallic shield portion having equiangularly spaced vertices and inwardly curved edge portions intermediate said vertices, said shield portion being of one-piece with said brace portion of said link body in the region and having opposite planar sides which lie along a plane in which said arm portions lie and bear information as to load factor and other analogous information, said shield portion having a transverse dimension in direction normally of the plane exceeding that of end sections of said arm portions and that of said brace portion so as to both reinforce the link body in the region of said brace portion weakened by said passage, and also make the load-bearing characteristic of the chain link readily determinable, whereby the onepiece construction of said arm portions, said brace portion and said shield portion strengthens the chain link; a generally U-shaped metallic shackle having spaced end portions each insertable into a respective one of said recesses and each having an interior bore which registers with said passage upon insertion of said end portions into said recesses; and a metallic bolt extending through said registering bores and passage for pivotally connecting said shackle with said link body for swinging movement in a path which is remote from said shield portion so as to prevent mechanical interference with the latter during pivoting movement of said shackle.

* * * * *